United States Patent [19]

Younkin

[11] 4,185,394
[45] Jan. 29, 1980

[54] SPHERICAL DISPLAY FOR ARTIFICIAL HORIZON INDICATOR

[76] Inventor: James R. Younkin, Edo-Aire Mitchell, 1500 S. Old Missouri Rd., Springdale, Ark. 72764

[21] Appl. No.: 895,250

[22] Filed: Apr. 10, 1978

[51] Int. Cl.$^2$ .............................................. G01C 19/34
[52] U.S. Cl. ..................................................... 33/329
[58] Field of Search ........................ 33/329, 328, 330; 340/27 AT, 27 NH

[56] References Cited

U.S. PATENT DOCUMENTS

| | | | |
|---|---|---|---|
| 2,404,603 | 7/1946 | Summers | 33/329 |
| 2,669,786 | 2/1954 | Lynch | 33/329 |
| 3,197,881 | 8/1965 | Burger | 33/329 |
| 3,579,847 | 5/1971 | Winter | 33/329 |
| 3,589,019 | 6/1971 | Culver | 33/329 |
| 3,792,427 | 2/1974 | Younkin | 33/329 |
| 3,827,157 | 8/1974 | Owens | 33/329 |
| 3,864,838 | 2/1975 | Owens et al. | 33/329 |

FOREIGN PATENT DOCUMENTS 368900   3/1939   Italy .............................................. 33/329

Primary Examiner—William D. Martin, Jr.
Attorney, Agent, or Firm—Richards, Harris & Medlock

[57] ABSTRACT

Artificial horizon indicators are precise, gyroscopic flight instruments designed to furnish an aircraft pilot with an artificial indication of an aircraft pitch and roll attitude with respect to earth. Basically, such indicators include a gyro gimbaled within a frame which is fixed to the aircraft. Roll indicia is responsive to the gyro for rotation within a display window as a part of the frame about an axis parallel to the roll axis of the aircraft. A spherically shaped horizon indicating member is also responsive to the gyro for movement within the display window to remain parallel to the actual horizon during flight of the aircraft. The spherical horizon indicating member is pivotally mounted to the frame between the gimbal axis of the gyro and the roll indicia. The coupling of a horizon indicating member to the gyro includes a two stage three pin drive to present the aircraft pilot a uniform movement of the horizon indicating member for movement of the aircraft about the pitch axis.

19 Claims, 8 Drawing Figures

SPHERICAL DISPLAY FOR ARTIFICIAL HORIZON INDICATOR

This invention relates to an aircraft instrument display and more particularly to a display for illustrating the attitude of an aircraft in pitch and roll.

Currently, gyro driven horizon reference indicators, known as "artificial horizons", are available on aircraft to provide visual indications of the aircraft's pitch and roll attitude with respect to the earth, such instruments being particularly useful during blind flying operations. Presently available conventional artificial horizon instruments visually present pitch and roll information to the pilot by means of a display having a fixed index representing the aircraft's position. The attitude of the aircraft is judged by comparing the fixed index with the position of a horizon display mounted behind the index and movable in response to a gyro that remains parallel to the true horizon independent of the aircraft's attitude. When the aircraft banks, a circular dial ring is provided in the display to visually indicate angular movement of the aircraft in roll with respect to graduated degree markings. Such previous reference indicators have additionally generated autopilot command signals by monitoring changes in position of the gyro gimbal. An example of an aircraft horizon display and steering indicator is the instrument illustrated and described in U.S. Pat. No. 3,792,427, issued Feb. 12, 1974.

Many artificial horizon indicators usually require a motion reversing linkage to couple the horizon display to the gyroscope in order to obtain the proper sense of indication. Heretofore, such motion reversing linkages were complicated mechanical interconnection of parts which, if improperly adjusted, were apt to present objectionable friction to the gyro gimbal system, thereby causing undesirable indicator errors. Further, the horizon display was pivoted and driven in a manner that a small motion of the aircraft about its pitch axis caused the display to be driven through most of its available motion. This presented to the aircraft pilot a distorted sense of aircraft pitch orientation.

In accordance with one embodiment of the present invention, a display adapted to be fixed within an aircraft includes movable indicators for visually illustrating the pitch and roll of the aircraft. Pitch indication of the aircraft attitude is provided by a horizon display of nearly spherical configuration which presents a substantially uniform movement over a wide range of aircraft pitch attitude.

Further in accordance with the present invention, a horizon display of nearly spherical configuration is pivotally mounted to the instrument frame between a gyro gimbaled within the frame and the instrument's front face. A coupling between the gyro and the horizon display provides substantially uniform motion to the display over a wide range of aircraft pitch changes.

In accordance with one embodiment of the invention, a gyro is gimbaled within a frame fixed relative to an aircraft. A marked roll indicia is responsive to the gyro to rotate relative to the frame about an axis parallel to the roll axis of the aircraft. A horizon display of substantially spherical configuration is also responsive to the gyro for movement relative to the frame and remains generally parallel to the actual horizon during flight of the aircraft. The horizon display is coupled to the gyro by a driven mechanism that presents nearly uniform motion over a wide range of aircraft motion about a pitch axis.

In accordance with a more specific embodiment of the invention, a horizon reference indicator provides an artificial indication of an aircraft attitude and includes a roll indicator. An attitude reference source mounted within an instrument frame fixed relative to the aircraft has a drive output generally parallel to the roll indicator, and responds to aircraft attitude changes with reference to the roll and pitch axis. A horizon display of substantially spherical configuration is positioned approximate the roll indicator and pivotally mounted to the instrument frame between the drive output of the reference source and the roll indicator. Movement of the instrument frame relative to the reference source is coupled to the horizon display to produce rotation thereof about the pivotal mounting.

For a more complete understanding of the present invention and for the advantages thereof, reference is now made to the following description taken in conjunction with the accompanying drawings.

Referring to the drawings.

Figure 1:
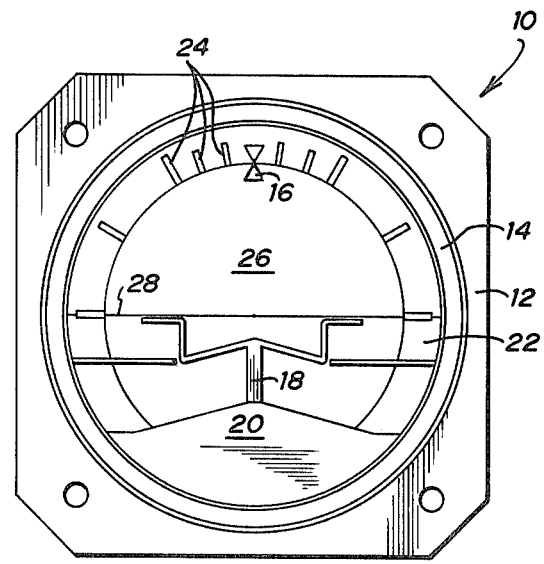
FIG. 1 is a front view of a horizon reference indicator of the present invention.

Referring to FIG. 1, the horizon reference indicator of the present invention is shown as comprising a display mounted in a frame 10; the forward portion is shaped to form a rectangular face plate 12 which is adapted to be mounted in the instrument panel of an aircraft. Movable indicators of the display are set in a circular cutout window 14 as part of the rectangular face plate 12 and are generally of contrasting colors for ease of visibility.

The attitude of an aircraft is available to a pilot by observing the relative positions of the movable indicators with respect to reference pointers. A reference pointer 16 is embossed or otherwise affixed to a sight glass that is attached to the frame 10 and is a reference for providing attitude information of an aircraft about the roll axis. A reference pointer 18 is mounted on a support 20 to represent the position of the aircraft with respect to a pitch axis. Thus, both pitch and roll information is presented to an aircraft pilot by means of indicators which are affixed to the instrument frame and so represent the aircraft position.

A marked roll indicia 22 is rotatable within the display about the roll axis of the aircraft for visually indicating the roll attitude thereof. The roll indicia 22, in the form of a dial ring, includes various reference markings 24 which are calibrated with respect to various standard roll angles. The horizon indicating member 26 occupies the centermost portion of the display and includes a horizontal line 28 embossed or otherwise imprinted thereon. Typically, the area of the horizon indicating member 26 above the horizon line 28 is colored blue to indicate a positive pitch axis of an aircraft and the lower section of the horizon indicating member below the horizon line is colored brown to indicate a negative pitch angle for the aircraft.

Figure 2:
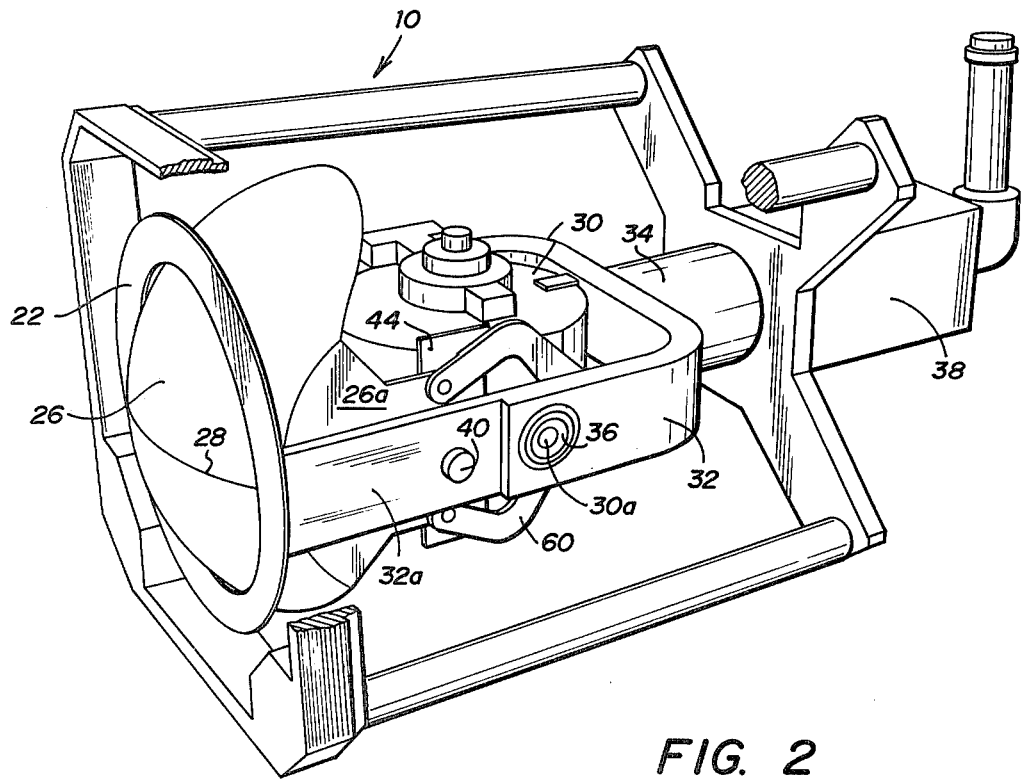
FIG. 2 is a pictorial view of the indicator of FIG. 1 with the frame partially cut away.

Referring to FIG. 2, the horizon indicating member 26 is illustrated as a section of a sphere partially extending through the roll indicia dial ring 22. To maintain a stabilized datum reference perpendicular to the earth, from which the pitch and roll attitude of an aircraft may be determined, a universally mounted, self-erecting, high speed rotor as part of a gyro 30 maintains itself stable relative to space. Typically, the gyro 30 is an accurately balanced, high speed air driven motor which is mounted on precision bearings inside the gyro housing. The gyro 30 is mounted within a U-shaped gimbal assembly 32 which in turn is rotatably mounted in a bearing housing 34 as part of the instrument frame 10. The rotor housing is suspended from bearings, such as bearing 36, as a part of the gimbal assembly 32 and is free to pivot in the vertical plane to an effective angle of approximately plus or minus 85° in pitch. The gimbal assembly 32 is suspended from bearings in the housing 34 such that the gyro has rotational freedom of movement about the roll axis of the aircraft.

A vacuum system, coupled to a manifold 38, at the rear of the frame 10, draws air at normal atmospheric pressure into the gyro 30 and directs the air against the periphery of the gyro motor to thereby cause the rotor to revolve at high speed. The air is exhausted through jets (not shown) and the gyro 30 thus serves as a reference with respect to changes in the attitude of the aircraft which is conventional a operation for such gyros. The air system for the gyro extends from the manifold 38 through the housing 34 and through a passage of one arm of the gimbal 32 into the rotor housing. Again, this is conventional construction for providing a gyro stabilized reference. In addition to air driven gyros, other types of gyros, such as magnetic field driven gyros, may be utilized.

Figure 3:
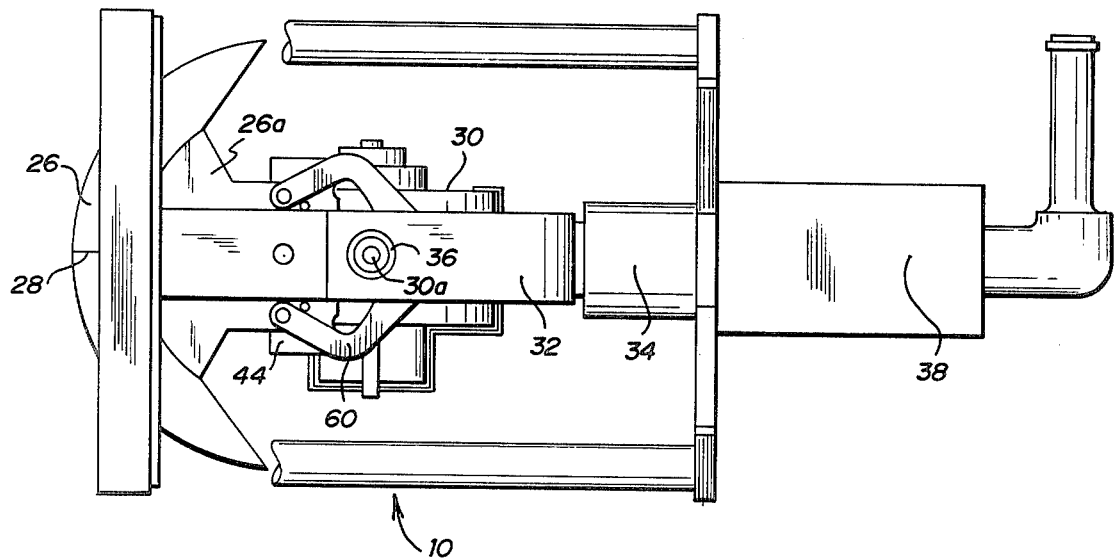
FIG. 3 is a side view, with the frame partially cut away, of the indicator of the present invention.
Figure 4:
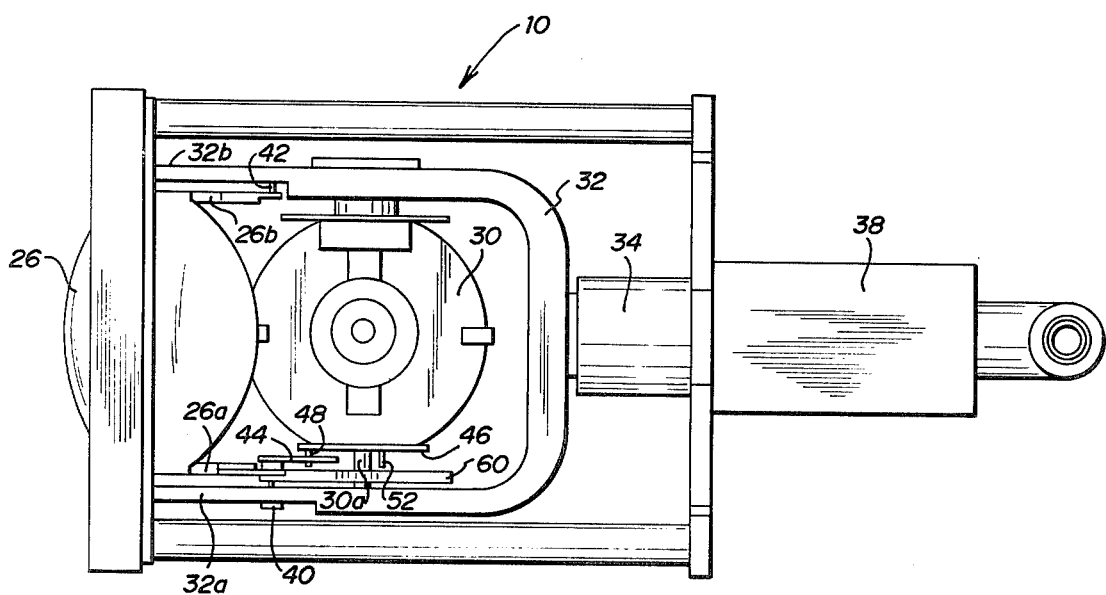
FIG. 4 is a top view of a gyro and drive mechanism linking to a spherical horizon display.

As best shown in FIGS. 2-4, the roll indicia 22 is mounted on arms 32a and 32b extending from the gyro gimbal assembly 32. With the bearing housing 34 mounted in the aircraft parallel to the roll axis, the roll indicia 22 is constrained to rotate about the roll axis of the aircraft. The horizon indicating member 26 is mounted behind and partially extends through the roll indicia 22 and is pivotably mounted on pivot shafts 40 and 42 to the arms 32a and 32b by means of arms 26a and 26b. Thus, with the gyro gimbal assembly 32 maintained stationary with respect to the pitch axis of the aircraft, any relative movements between the gyro gimbal assembly and the gyro 30 produces a rotation of the horizon indicating member 26 vertically about the pitch axis of the aircraft. Thus, the roll indicia 22 and the horizon indicating member 26 provide a visual indication of the roll of the aircraft and also the pitch of the aircraft as represented by the frame 10.

Figure 5:
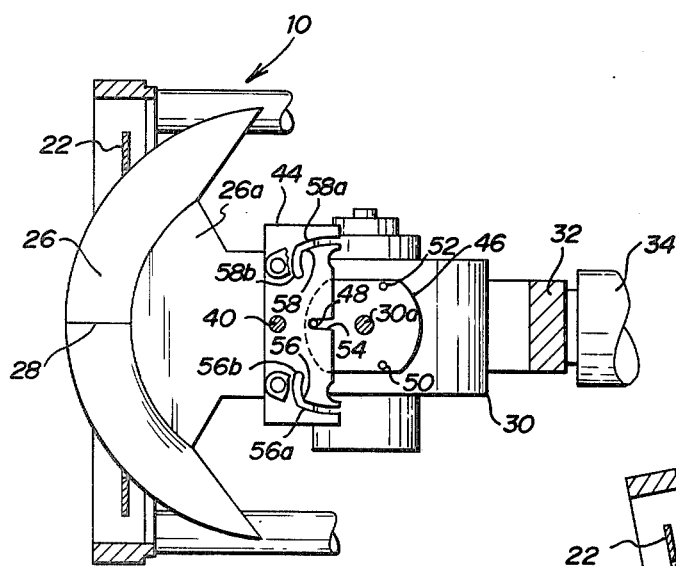
FIGS. 5–8 are partial side views of the present indicator illustrating positional relationships between a gyro reference source and a horizon display coupled by means of a three pin drive.

Referring to FIGS. 2-5, the position of the gyro 30 is coupled to the horizon indicating member 26 by means of a three position cam follower 44 and a three pin cam 46, the latter attached to the motor housing of the gyro 30 at the gimbal shaft. The cam 46 includes a center movement pin 48, a positive pitch angle pin 50 and a negative pitch angle pin 52. Each of these pins engages a respective camming surface formed in the cam follower plate 44. As illustrated in FIG. 5, the center movement pin 48 engages a camming surface 54 at approximately the center position of the cam follower 44. The positive pitch angle pin 50 engages a camming surface 56 and the negative pitch angle pin 52 engages a camming surface 58.

The cam follower 44 is pinned to the arm 26a along with a balance weight 60 at the shaft 40 such that the camming surfaces are positioned between the shaft and the gimbal bearing 36. Thus, as the gyro gimbal assembly 32 moves with reference to the gyro 30, the three pin cam 46 rotates about the gyro shaft 30a to drive the cam follower 44 which in turn rotates the horizon indicating member 26 about the pivot shafts 40 and 42. This gives the pilot of an aircraft the indication of either a positive or negative pitch angle with respect to the horizon.

FIGS. 5-8 illustrate various relative positions of the horizon indicating member 26 to show operation of the apparatus of the invention that provides the pilot with visual indications of the position of the aircraft with respect to the actual horizon which is in addition to providing the pilot with degree indications of airplane bank by means of the roll indicia 22. When in level flight the gyro 30 and the gyro assembly 32 are in alignment as shown in FIG. 5 and the center movement pin 48 is in engagement with the camming surface 54 of the cam follower 44 to hold the horizon indicating member 26 such that the horizon line 28 is in alignment with the reference index 18. The aircraft can be in either level flight with respect to the roll axis or at some roll angle relative thereto.

Figure 6:
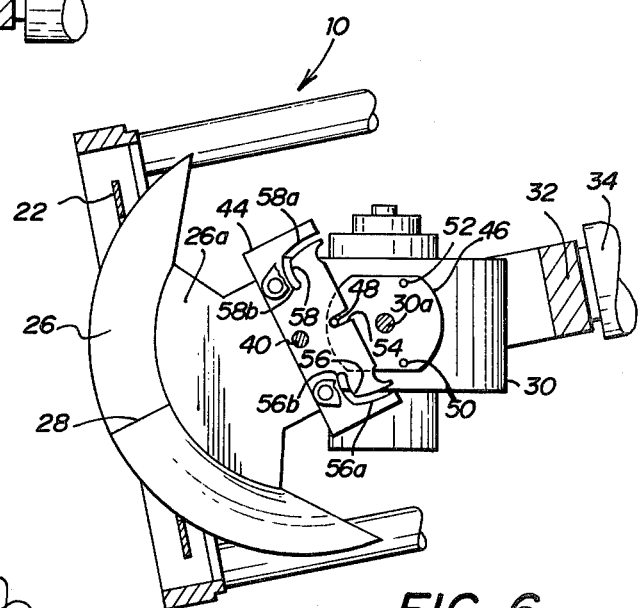

As the aircraft is placed into a climb, the relative position of the gyro 30 and the gyro gimbal assembly 32 are displaced with respect to each other such as illustrated in FIG. 6. The relative displacement illustrated in FIG. 6 is for a slight positive angle about the pitch axis such as when the aircraft is in a gradual climb. Movement of the gyro gimbal assembly 32 with respect to the gyro 30 produces a clockwise rotation which is imparted to the horizon indicating display 26 through the center movement pin 48 in engagement with the camming surface 54. This imparts a counterclockwise rotation to the horizon indicating member 26 about the pivot shaft 40.

Figure 7:
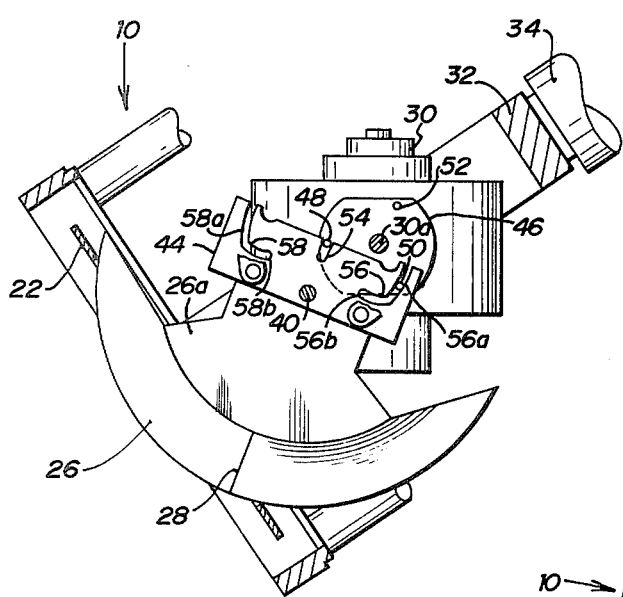

As the aircraft is put into a steeper climb, the relative position of the gyro 30 with respect to the gyro gimbal assembly 32 is further displaced as illustrated in FIG. 7. Again, the motion of the gyro gimbal assembly 32 with respect to the gyro 30 produces a clockwise rotation which is imparted to the horizon indicating member 26 through the cam 46 and the cam follower 44. However, at the angle of climb as indicated in FIG. 7 the center movement pin 48 is disengaged from contact with the camming surface 54 and the positive pitch angle pin 50 now drives the horizon indicating member 26 by engagement with the camming surface 56. The engagement of the positive pitch angle pin 50 with the camming surface 56 imparts a counterclockwise rotation in the horizon display about the pivot shaft 40. Note that the horizon display has rotated to about 40% of its total rotation from the position illustrated in FIG. 5 to the position illustrated in FIG. 7 where the center movement pin 48 becomes disabled from driving the display and the positive pitch angle pin 50 takes over control of the display rotation.

Throughout this first interval, angular rotation of the horizon indicating member 26 is substantially uniform for increasing climb angles, that is, positive angles with respect to the pitch axis. The positive pitch angle pin 50 continues to impart rotary motion to the horizon indicating member 26 as the relative position of the gyro gimbal assembly 32 varies with respect to the gyro 30. By the proper selection of the camming configuration of the camming surface 56, the motion of the horizon indicating member 26 is at a substantially uniform angular rate for increasing climb angles. Thus, the pilot is given a substantially uniform change in rotational positions of the horizon indicating member 26 for very gradual climb angles to extreme climb angles.

The positive pitch angle pin 50 continues to control rotation of the horizon indicating member 26 by engagement with the first section 56a of the camming surface 56. Then for very steep climb angles where the gyro gimbal is at approximately 85° displaced from the gyro 30, the positive pitch angle pin 50 enters the section 56b of the camming surface 56 and the horizon indicating member 26 is now in its extreme counterclockwise rotational position.

Figure 8:
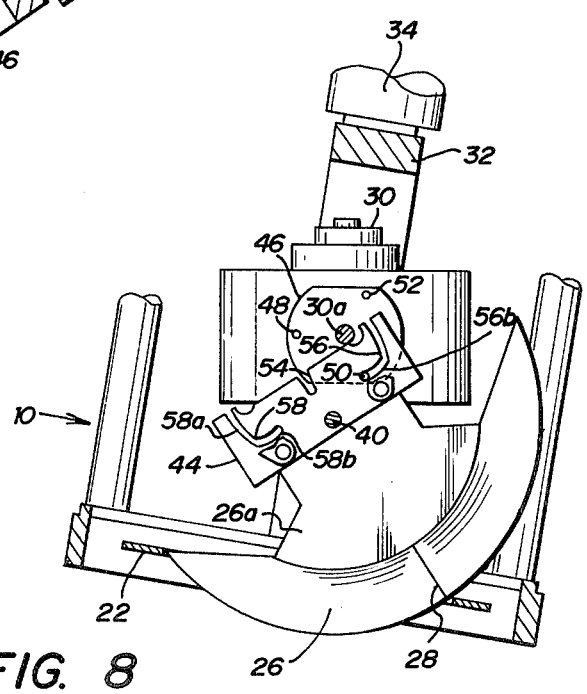

At the time that the pin 50 enters the section 56b of the camming surface 56 the horizon indicating member 26 has rotated to the position shown in FIG. 8 and additional relative displacement of the gyro gimbal assembly 32 with respect to the gyro 30 does not effect the rotational position of the horizon indicating member 26. Although the pilot at this time does not have available an indication of the climb angle, the extreme counterclockwise position of the horizon indicating member 26 is sufficient to indicate an extreme climb attitude of the aircraft.

For angles of aircraft descent, the relative position of the gyro gimbal assembly 32 and the gyro 30 as illustrated in FIGS. 6–8 would be reversed. The horizon indicating member 26 would rotate clockwise about the pivot shaft 40. For gradual angles of descent, the center movement pin 48 drives the horizon indicating member 26 by engagement with the camming surface 54. After about 40% of the rotation of the horizon indicating member 26 in a clockwise direction the center movement pin 48 becomes disengaged from the camming surface 54 and the negative pitch angle pin 52 engages the slot 58 of the follower plate 44. The negative pitch angle pin 52 now controls the rotational motion of the horizon indicating member 26 until passing from the section 58a to the section 58b of the camming surface 58.

As explained previously with reference to climb angles, an extreme angle of descent causes the horizon indicating member 26 to be rotated to its extreme clockwise position and the negative pitch angle pin 52 is ineffective to drive the display as it enters the section 58b of the camming surface 58.

The illustrations of FIGS. 5–8 show the gyro 30 in a fixed position and the gyro gimbal assembly 32 rotated with respect thereto. When operating in an aircraft the gyro 30 is the stable member maintaining a relatively fixed position with respect to the horizon. The gyro gimbal assembly 32 varies with the angle of the aircraft with respect to the pitch axis and is rotated with respect to the stable platform established by the gyro. The illustrations are intended to describe the relative position of the elements of the apparatus of the present invention for various relative positions of the gyro 30 with respect to the gimbal assembly 32.

While only one embodiment of the invention, together with modifications thereof, has been described in detail herein and shown in the accompanying drawings, it will be evident that various further modifications are possible without departing from the scope of the invention.

What is claimed is:

1. A horizon reference indicator for providing an artificial indication of an aircraft attitude, comprising in combination:
    a frame having side members,
    a roll indicator attached to said frame at one end thereof to rotate therewith,
    an attitude reference source mounted within said frame between the side members thereof and having a drive output displaced from said roll indicator, said attitude reference source responding to the aircraft attitude,
    a horizon display position approximate the roll indicator to move in relationship thereto and having an arm extending therefrom in the direction of said reference source,
    means for pivotally mounting the arm of said horizon display to one side member of said frame at a point located between the drive output of said reference source and said roll indicator, and
    means for coupling the movement of said frame relative to said reference source to said horizon display to produce movement thereof about said means for pivotally mounting.

2. A horizon reference indicator as set forth in claim 1 wherein said reference source includes a gyro gimbaled to the side members within said frame and having one gimbal axis generally parallel to said roll indicator.

3. A horizon reference indicator as set forth in claim 1 wherein said horizon display has a generally spherical configuration.

4. A horizon reference indicator as set forth in claim 1 wherein said roll indicator comprises an indicia ring mounted to the frame.

5. A horizon reference indicator as set forth in claim 1 wherein said means for coupling includes a first drive for imparting motion to said horizon display for a first segment of motion thereof, a second drive imparting motion to said horizon display for a second segment of motion thereof independent of the first segment, and a third drive for imparting motion to said horizon display for a third segment of motion independent of the first and second segments.

6. A horizon reference indicator as set forth in claim 5 wherein said first, second and third drives each includes a cam and cam follower.

7. A horizon reference indicator as set forth in claim 6 wherein said second drive includes a cam and cam follower for coupling the position of said drive relative to the frame for an attitude of the aircraft in a first direction, and said third drive includes a cam and cam follower for coupling the position of the drive relative to the frame for an attitude of the aircraft in a second direction.

8. A horizon reference indicator for providing an artificial indication of an aircraft attitude, comprising in combination:
    a frame having one end terminating at a display surface and including side arms,
    an attitude reference source mounted within said frame between the side arms thereof and having a drive output displaced from the display surface,
    a horizon display positioned to be visible at the display surface to move in relationship thereto and having an arm extending therefrom in the direction of said reference source,
    means for pivotally mounting the arm of said horizon display to one side arm of said frame at a point located between the drive output of said reference source and the display surface, and means for coupling the drive output of said reference source to said horizon display to produce motion thereof about said means for pivotally mounting.

9. A horizon reference indicator as set forth in claim 8 wherein said means for coupling includes a first drive for imparting motion to said horizon display for a first segment of motion thereof, a second drive for imparting motion to said horizon display for a second segment of motion thereof, the second segment of motion independent of the first segment of motion, and a third drive for imparting motion to said horizon display for a third segment of motion independent of the first and second segments.

10. A horizon reference indicator as set forth in claim 9 wherein said first drive includes a cam and cam follower for coupling the drive output of said reference source to said horizon indicator for a first pitch attitude of the aircraft, said second drive includes a cam and cam follower for coupling the drive output of said reference source to said horizon indicator for a second pitch attitude of the aircraft, and said third drive includes a cam and cam follower for coupling the drive output of said reference source to the horizon indicator for a third attitude of the aircraft.

11. A horizon reference indicator as set forth in claim 10 wherein said first drive couples the drive output of said reference source to the horizon indicator for a pitch attitude of the aircraft plus and minus a horizontal attitude.

12. A horizon reference indicator as set forth in claim 8 wherein said display surface includes a roll indicia ring mounted to the frame.

13. A horizon reference indicator for providing an artificial indication of an aircraft pitch and roll, comprising in combination:

a frame having a roll indicia ring mounted to one end thereof and including side arms, a gyro gimbaled within said frame between the side arms thereof and having one gimbal axis generally parallel to the roll indicia ring, a horizon display positioned to be visible at the roll indicia ring to move in relationship thereto and having an arm extending therefrom in the direction of said gyro, means for pivotally mounting the arm of said horizon display to one side arm of said frame at a point located between the one gimbal axis of said gyro and the roll indicia ring, and means for coupling the movement of said frame relative to said gyro to said horizon display to produce rotation thereof about said means for pivotally mounting.

14. A horizon reference indicator as set forth in claim 13 wherein said means for coupling includes a first member attached to said gyro, said first member including first, second and third drive pins, and a second member attached to said horizon display and including first, second and third cams for engagement with the first, second and third drive pins respectively.

15. A horizon reference indicator as set forth in claim 13 wherein said horizon display has a substantially spherical configuration.

16. A horizon reference indicator as set forth in claim 15 wherein said means for coupling includes a first drive for imparting motion to said spherical display for a first segment of motion thereof, a second drive for imparting motion to said spherical display for a second segment of motion thereof, and a third drive for imparting motion to said spherical display for a third segment of motion.

17. A horizon reference indicator as set forth in claim 16 wherein said first, second and third drives each includes a cam and cam follower.

18. A horizon reference indicator as set forth in claim 16 wherein said first drive includes a cam and cam follower, said second drive includes a cam and cam follower for coupling the position of said gyro relative to said frame for a pitch attitude of the aircraft in a first direction, and said third drive includes a cam and cam follower for coupling the position of said gyro relative to said frame for a pitch attitude of the aircraft in a second direction.

19. A horizon reference indicator as set forth in claim 15 wherein said first drive couples the position of said gyro relative to the frame for a pitch attitude of the aircraft plus and minus a horizontal attitude.

* * * * *